(12) United States Patent
Sawada

(10) Patent No.: US 9,922,765 B2
(45) Date of Patent: Mar. 20, 2018

(54) MANUFACTURING METHOD FOR LAMINATED ELECTRONIC COMPONENT

(71) Applicant: Murata Manufacturing Co., Ltd., Nagaokakyo-shi, Kyoto-fu (JP)

(72) Inventor: Takashi Sawada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 333 days.

(21) Appl. No.: 14/520,386

(22) Filed: Oct. 22, 2014

(65) Prior Publication Data

US 2015/0116900 A1  Apr. 30, 2015

(30) Foreign Application Priority Data

Oct. 28, 2013 (JP) ................. 2013-223257
Aug. 21, 2014 (JP) ................. 2014-168073

(51) Int. Cl.
| | |
|---|---|
| *H01G 4/012* | (2006.01) |
| *H01G 4/12* | (2006.01) |
| *H01G 4/30* | (2006.01) |
| *H01G 4/248* | (2006.01) |
| *H01G 4/35* | (2006.01) |
| *H01G 4/232* | (2006.01) |
| *B32B 38/04* | (2006.01) |

(52) U.S. Cl.
CPC ............ *H01G 4/012* (2013.01); *H01G 4/12* (2013.01); *H01G 4/232* (2013.01); *H01G 4/248* (2013.01); *H01G 4/30* (2013.01); *H01G 4/304* (2013.01); *H01G 4/306* (2013.01); *H01G 4/308* (2013.01); *H01G 4/35* (2013.01); *B32B 38/04* (2013.01); *B32B 2038/045* (2013.01); *Y10T 29/43* (2015.01); *Y10T 29/435* (2015.01); *Y10T 156/1062* (2015.01)

(58) Field of Classification Search
CPC .......... H01G 4/012; H01G 4/12; H01G 4/248; H01G 4/30; H01G 4/304; H01G 4/306; H01G 4/308; H01G 4/35; H01G 4/232; Y10T 29/43; Y10T 29/435; Y10T 156/1062; B32B 38/04; B32B 2038/045
See application file for complete search history.

(56) References Cited

U.S. PATENT DOCUMENTS

| | | | |
|---|---|---|---|
| 4,771,520 A † | 9/1988 | Tanaka | |
| 6,091,598 A * | 7/2000 | Kobayashi | H01G 4/304 257/E21.53 |
| 7,715,171 B2 * | 5/2010 | Nakano | H01G 4/012 361/303 |
| 2008/0165468 A1† | 7/2008 | Berolini et al. | |
| 2011/0002082 A1† | 1/2011 | Bultitude et al. | |

(Continued)

FOREIGN PATENT DOCUMENTS

| | | |
|---|---|---|
| JP | 08-037129 A | 2/1996 |
| JP | 2012059800 A * | 3/2012 |

*Primary Examiner* — A. Dexter Tugbang
(74) *Attorney, Agent, or Firm* — Keating & Bennett, LLP

(57) ABSTRACT

In a method of manufacturing a laminated electronic component, in a step of obtaining a laminate, a position of a second green sheet with respect to a first green sheet is determined such that an overall width of a first portion printed on the first green sheet and a second portion printed on the second green sheet becomes substantially equal to a width of the first portion or a width of the second portion.

16 Claims, 11 Drawing Sheets

(56) References Cited

U.S. PATENT DOCUMENTS

2011/0267736 A1\* 11/2011 Sasabayashi ............ H01G 4/30
　　　　　　　　　　　　　　　　　　　　　　　361/301.1
2013/0208398 A1† 8/2013 Tanaka et al.

\* cited by examiner
† cited by third party

MANUFACTURING METHOD FOR LAMINATED ELECTRONIC COMPONENT

BACKGROUND OF THE INVENTION

1. Field of the Invention

The present invention relates to a laminated electronic component manufacturing method and to a laminated electronic component.

2. Description of the Related Art

Hitherto, as a method of manufacturing a laminated electronic component such as a laminated ceramic electronic component, a method of forming a mother laminate serving as a base material of an electronic component by laminating green sheets on which conductive paste layers are printed is known (for example, see Japanese Unexamined Patent Application Publication No. 8-37129).

Japanese Unexamined Patent Application Publication No. 8-37129 describes manufacturing a mother laminate by preparing green sheets on which both a first conductive paste layer that configures a first inner electrode and a second conductive paste layer that configures a second inner electrode are printed, and laminating the green sheets while alternately displacing the green sheets by a certain amount. Since the method described in Japanese Unexamined Patent Application Publication No. 8-37129 does not necessarily involve the necessity of preparing a plurality of types of green sheets, a mother laminate can be easily manufactured.

The method described in Japanese Unexamined Patent Application Publication No. 8-37129 has difficulty in aligning the laminated green sheets, and it is thus difficult to provide the inner electrodes with high positional precision.

SUMMARY OF THE INVENTION

Accordingly, preferred embodiments of the present invention provide a method of manufacturing a laminated electronic component in which inner electrodes are provided with high positional precision.

A laminated electronic component manufacturing method according to a preferred embodiment of the present invention is a laminated electronic component manufacturing method including the following steps: preparing a plurality of green sheets, laminating, and producing a laminated electronic component from a laminate. The laminated electronic component includes an electronic component main body and first and second inner electrodes. The first and second inner electrodes are laminated in one direction in the electronic component main body. The first inner electrode includes a first facing portion that faces in the one direction the second inner electrode. The second inner electrode includes a second facing portion that faces in the one direction the first facing portion. On the green sheets, both a first conductive film and a second conductive film are formed. The first conductive film configures the first inner electrode. The second conductive film configures the second inner electrode. The first conductive film includes a first portion. The first portion configures the first facing portion. The second conductive film includes a second portion. The second portion configures the second facing portion. The first and second conductive films are formed on the green sheets such that the width of the first portion and the width of the second portion are identical or substantially identical. In the step of laminating, a laminate is obtained by laminating the plurality of green sheets. At this time, the position of a second green sheet with respect to a first green sheet is determined. The determination of the position is performed such that the overall width of the first portion printed on the first green sheet and the second portion printed on the second green sheet positioned on the first green sheet becomes equal or substantially equal to the width of the first portion or the width of the second portion.

The first conductive film preferably includes a plurality of first conductive films, and the plurality of first conductive films are preferably formed in one direction on the green sheets. The second conductive film preferably includes a plurality of second conductive films, and the plurality of second conductive films are preferably formed in the one direction on the green sheets.

The plurality of first conductive films are preferably formed in the one direction while being connected with each other, and the first and second conductive films may be alternately formed in another direction that is perpendicular or substantially perpendicular to the one direction.

The electronic component main body may include first and second main surfaces, first and second side surfaces that face each other, and third and fourth side surfaces that face each other. The first inner electrode preferably is extended to the first and second side surfaces. The second inner electrode preferably is extended to the third and fourth side surfaces.

It is preferable to print the first and second conductive films along an edge in a width direction of the first and second conductive films because blurring of the first and second conductive films in a direction perpendicular or substantially perpendicular to the width direction is suppressed or prevented.

It is preferable to form the first and second conductive films by gravure printing, for example.

In the step of preparing a plurality of green sheets, after printing the first and second conductive films while carrying a mother sheet that configures the plurality of green sheets in one direction, the mother sheet preferably is cut to obtain a plurality of green sheets on which the first and second conductive films are printed. In the step of laminating, the laminate preferably is obtained by laminating the second green sheet positioned on the first green sheet while displacing the second green sheet from the first green sheet in a direction orthogonal to the one direction such that the first conductive film and the second conductive film overlap each other.

A laminated electronic component according to another preferred embodiment of the present invention is a laminated electronic component manufactured by the above-described method.

According to various preferred embodiments of the present invention, a laminated electronic component in which inner electrodes are provided with high positional precision is manufactured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
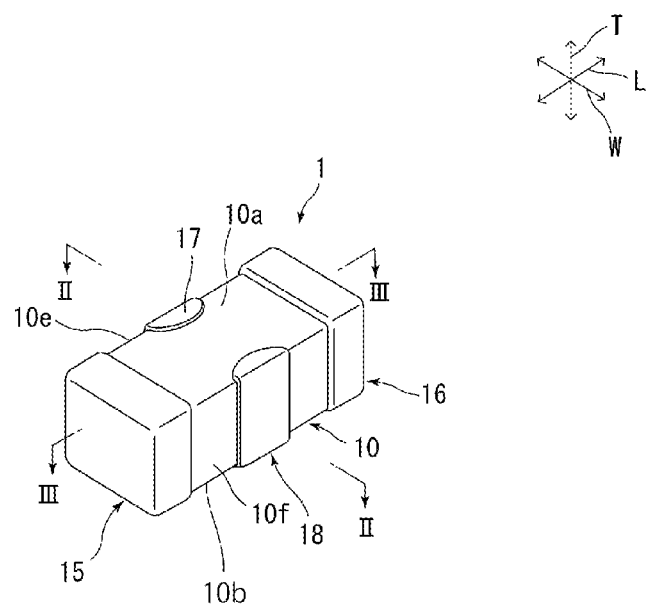
FIG. 1 is a schematic perspective view of a laminated ceramic capacitor according to a preferred embodiment of the present invention.

Hereinafter, preferred exemplary preferred embodiments of the present invention will be described. Note that the following preferred embodiments are only examples. The present invention is not limited to the following preferred embodiments.

In addition, in each of the drawings referred to in the description of preferred embodiments and the like, members having the same or substantially the same functions are denoted by the same reference numerals. In addition, the drawings referred to in the description of preferred embodiments and the like are drawn schematically. Dimensional ratios and the like of objects drawn in the drawings may differ from the actual dimensional ratios and the like of the objects. The dimensional ratios and the like of the objects may also differ between the drawings. Specific dimensional ratios and the like of the objects are to be determined in consideration of the following description.

A laminated electronic component manufacturing method according to a preferred embodiment preferably may be a laminated ceramic capacitor manufacturing method, or any other laminated electronic component manufacturing method as long as the laminated electronic component includes inner electrodes having two or more shapes. Hereinafter, the case in which a laminated electronic component manufacturing method according to one of various preferred embodiments of the present invention is a laminated feedthrough ceramic capacitor manufacturing method will be described by way of example.

Figure 2:
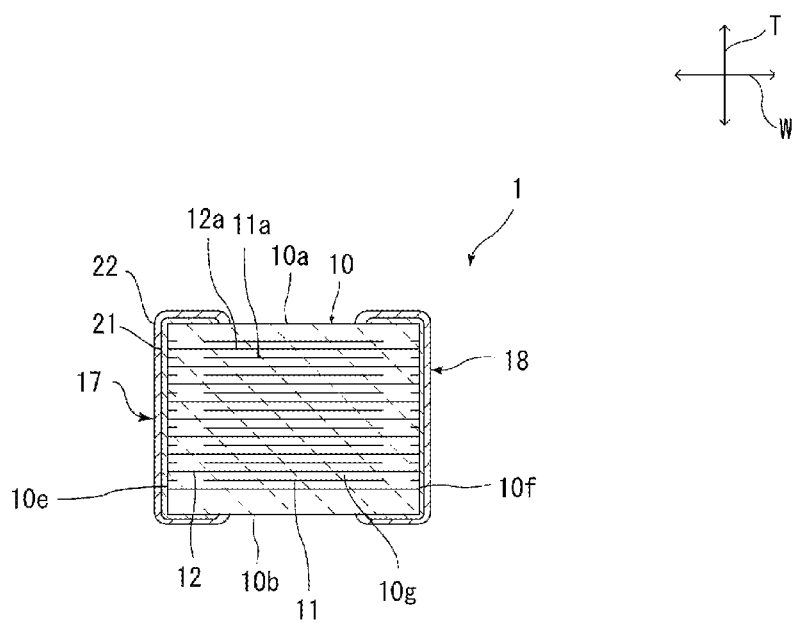
FIG. 2 is a schematic cross-sectional view taken along line II-II of FIG. 1.
Figure 3:
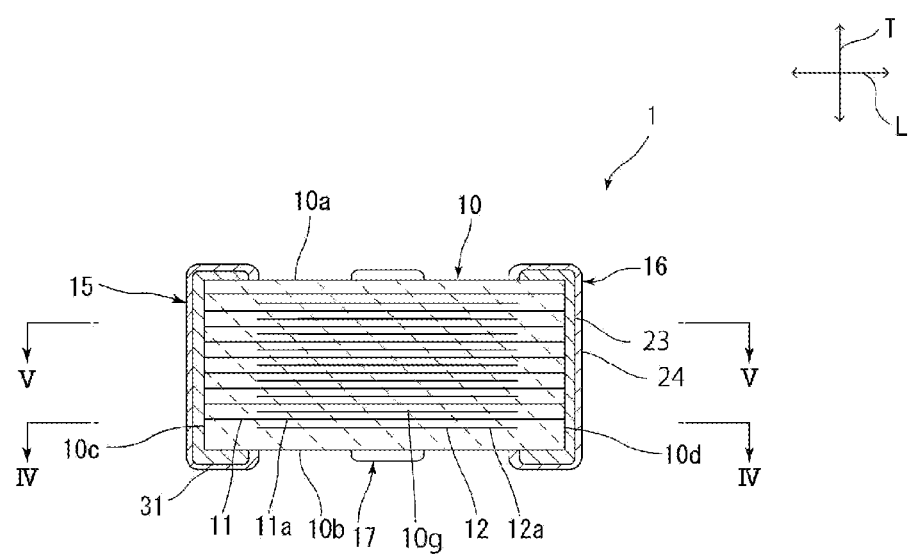
FIG. 3 is a schematic cross-sectional view taken along line III-III of FIG. 1.
Figure 4:
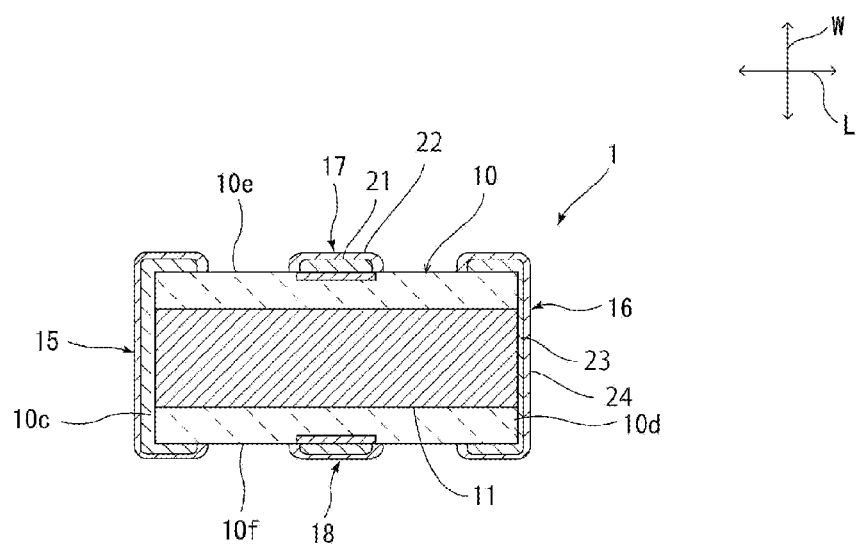
FIG. 4 is a schematic cross-sectional view taken along line IV-IV of FIG. 3.
Figure 5:
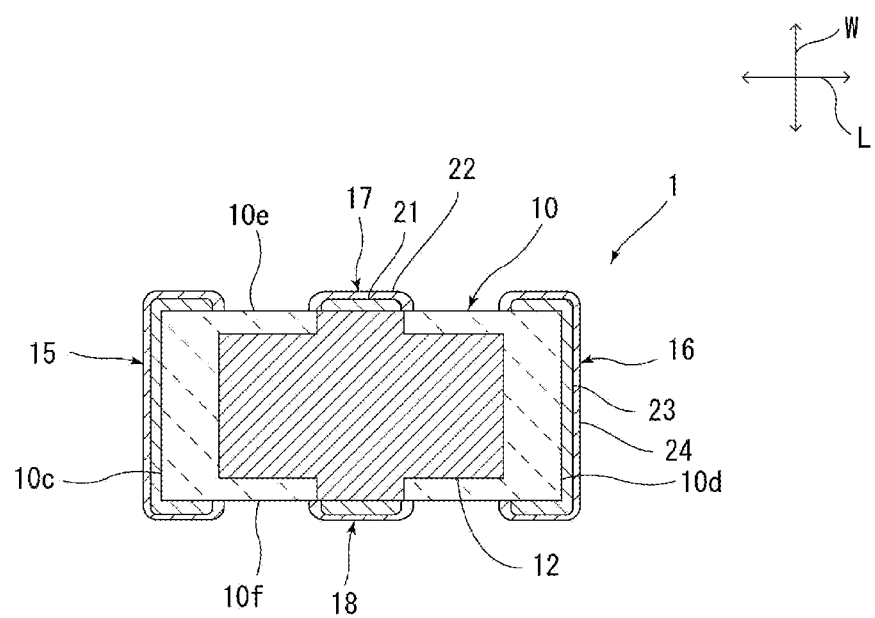
FIG. 5 is a schematic cross-sectional view taken along line V-V of FIG. 3.

FIG. 1 is a schematic perspective view of a laminated feedthrough ceramic capacitor according to a preferred embodiment of the present invention. FIG. 2 is a schematic cross-sectional view taken along line II-II of FIG. 1. FIG. 3 is a schematic cross-sectional view taken along line III-III of FIG. 1. FIG. 4 is a schematic cross-sectional view taken along line IV-IV of FIG. 3. FIG. 5 is a schematic cross-sectional view taken along line V-V of FIG. 3.

As illustrated in FIGS. 1 to 5, a laminated feedthrough ceramic capacitor 1 includes a capacitor main body that is an electronic component main body. The capacitor main body 10 preferably has a rectangular or substantially rectangular parallelepiped shape, for example. The corners and ridges of the capacitor main body 10 preferably have chamfered or rounded shapes. In addition, main surfaces and side surfaces may be uneven.

The capacitor main body 10 includes first and second main surfaces 10a and 10b, first and second side surfaces 10c and 10d, and third and fourth side surfaces 10e and 10f.

The first and second main surfaces 10a and 10b extend in a width direction W serving as a first direction and a length direction L serving as a second direction. The length direction L is orthogonal to the width direction W. The first main surface 10a and the second main surface 10b face each other in a thickness direction T serving as a third direction. The thickness direction T is orthogonal to each of the length direction L and the width direction W.

Note that, in the present preferred embodiment, an example in which the first direction is the width direction W and the second direction is the length direction L will be described. However, the preferred embodiments are not limited to this configuration. For example, the first direction may be the length direction L, and the second direction may be the width direction W. That is, the longitudinal direction of the capacitor main body 10 may extend in the first direction or in the second direction.

The first and second side surfaces 10c and 10d extend in the width direction W serving as the first direction and the thickness direction T serving as the third direction. The first side surface 10c and the second side surface 10d face each other in the length direction L.

The third and fourth side surfaces 10e and 10f extend in the length direction L serving as the second direction and the thickness direction T serving as the third direction. The third side surface 10e and the fourth side surface 10f face each other in the width direction W.

The capacitor main body 10 may be configured with a ceramic body composed of dielectric ceramics. Hereinafter, in the present preferred embodiment, an example in which the capacitor main body 10 is configured with dielectric ceramics will be described.

Specific examples of dielectric ceramics include, for example, $BaTiO_3$, $CaTiO_3$, $SrTiO_3$, and $CaZrO_3$. The ceramic body may be added with, for example, a Mn compound, a Mg compound, a Si compound, a Fe compound, a Cr compound, a Co compound, a Ni compound, or a rare-earth compound.

As illustrated in FIGS. 2 and 3, first inner electrodes 11 and second inner electrodes 12 are provided in the capacitor main body 10. The first inner electrodes 11 and the second inner electrodes 12 face each other in the thickness direction T across ceramic portions 10g. Specifically, in the capacitor main body 10, the first inner electrodes 11 and the second inner electrodes 12 are alternately arranged at intervals in the thickness direction T. Each of the first inner electrodes 11 includes a first facing portion 11a that faces a corresponding one of the second inner electrodes 12 in the thickness direction T. Each of the second inner electrodes 12 includes a second facing portion 12a that faces a corresponding one of the first facing portions 11a in the thickness direction T.

The first and second inner electrodes 11 and 12 preferably are configured with metal such as Ni, Cu, Ag, Pd, Au, Ag—Pd alloy or the like.

As illustrated in FIGS. 3 and 4, the first inner electrodes 11 are extended to the first side surface 10c and the second side surface 10d. The first inner electrodes 11 are electrically connected to a first signal terminal electrode 15 arranged on the first side surface 10c and to a second signal terminal electrode 16 arranged on the second side surface 10d. As illustrated in FIG. 1, the first signal terminal electrode 15 extends from the first side surface 10c to the first and second main surfaces 10a and 10b and to the third and fourth side surfaces 10e and 10f. The second signal terminal electrode 16 extends from the second side surface 10d to the first and second main surfaces 10a and 10b and to the third and fourth side surfaces 10e and 10f.

As illustrated in FIGS. 2 and 5, the second inner electrodes 12 are extended to the third side surface 10e and the fourth side surface 10f. The second inner electrodes 12 are electrically connected to a first ground terminal electrode 17 arranged on the third side surface 10e and to a second ground terminal electrode 18 arranged on the fourth side surface 10f. As illustrated in FIG. 1, the first ground terminal electrode 17 extends from the third side surface 10e to the first and second main surfaces 10a and 10b. The second ground terminal electrode extends from the fourth side surface 10f to the first and second main surfaces 10a and 10b.

The first and second ground terminal electrodes 17 and 18 each include a first electrode layer 21 provided on the third or fourth side surface 10e or 10f, and a second electrode layer 22 provided on the first electrode layer 21.

The first electrode layer 21 and the second electrode layer 22 each include glass and a conductive material. In the present preferred embodiment, specifically, the first and second electrode layers 21 and 22 preferably are each a baked electrode layer formed by baking a paste including a glass powder and a conductive material. The conductive material preferably is configured with metal such as Ni, Cu, Ag, Pd, Au, Ag—Pd alloy, or the like.

The first and second ground terminal electrodes 17 and each may further include an electrode layer other than the first and second electrode layers 21 and 22. The first and second ground terminal electrodes 17 and 18 each may further include, for example, at least one plated film provided on the second electrode layer 22.

The first and second signal terminal electrodes 15 and 16 each include a third electrode layer 23 provided on the first or second side surface 10c or 10d, and a fourth electrode layer 24 provided on the third electrode layer 23.

The third electrode layer 23 and the fourth electrode layer 24 each include glass and a conductive material. In the present preferred embodiment, specifically, the third and fourth electrode layers 23 and 24 preferably are each a baked electrode layer formed by baking a paste including a glass powder and a conductive material. The conductive material preferably is configured with metal such as Ni, Cu, Ag, Pd, Au, Ag—Pd alloy, or the like.

The first and second signal terminal electrodes 15 and each may further include an electrode layer other than the third and fourth electrode layers 23 and 24. The first and second signal terminal electrodes 15 and 16 each may further include, for example, at least one plated film provided on the fourth electrode layer 24.

A method of manufacturing the laminated feedthrough ceramic capacitor 1 is not particularly limited. The laminated feedthrough ceramic capacitor 1 can be manufactured in the following way, for example.

First, ceramic green sheets including a ceramic powder are prepared. The ceramic green sheets can be produced by, for example, printing a ceramic paste including a ceramic powder and the like.

Figure 6:
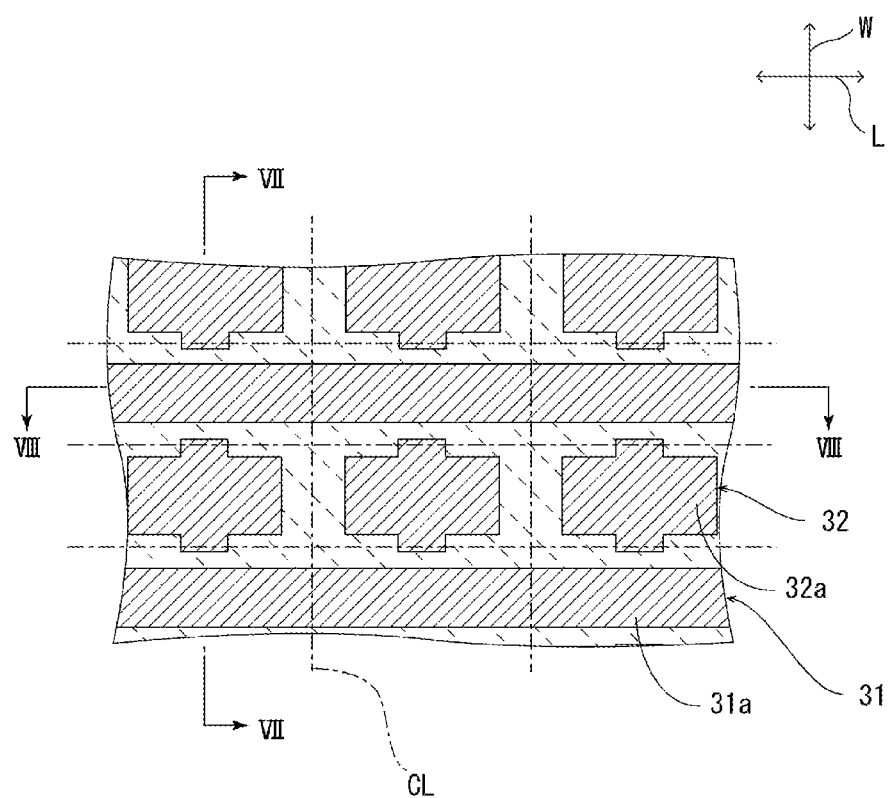
FIG. 6 is a cross-sectional view of a mother laminate.

Next, as illustrated in FIG. 6, first and second conductive paste layers 31 and 32 configuring first and second conductive films are formed by applying a conductive paste onto the ceramic green sheets configuring a mother laminate. Although the first conductive paste layer 31 is continuously formed in a strip shape in the length direction L in FIG. 6, the first conductive paste layer 31 is not limited to this configuration. Alternatively, the first conductive paste layer may be formed in a plurality of separate portions in the length direction L. The first and second conductive films may currently have conductivity or may have conductivity in the future, like conductive paste layers.

Application of a conductive paste can be performed by various printing methods, such as a screen printing method, for example. The first and second conductive films may be formed by other methods, such as sputtering, chemical-vapor deposition (CVD), or plating. In particular, the manufacturing efficiency can be increased by adopting a method of forming the first and second conductive films by gravure printing while carrying the green sheets in one direction, and then cutting the green sheets at certain positions, thus obtaining a plurality of green sheets on which the first and second conductive films are formed.

Figure 7:
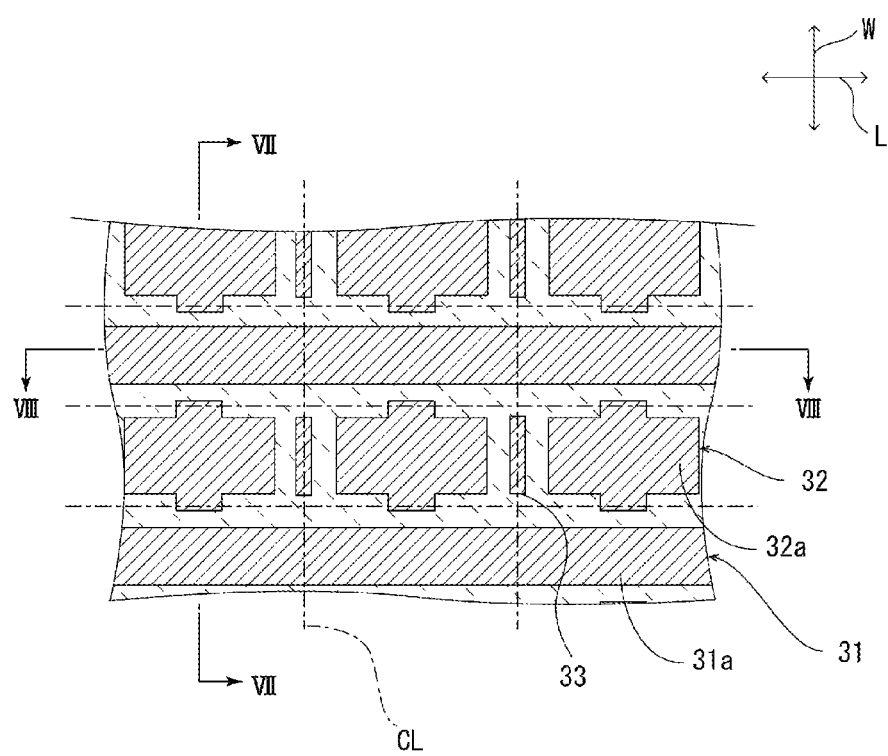
FIG. 7 is a cross-sectional view illustrating another example of the mother laminate.

As illustrated in FIG. 7, the first and second conductive paste layers 31 and 32, and a conductive paste layer 33 that configures a dummy electrode are formed on the ceramic green sheets configuring a mother laminate that configures a ceramic laminate illustrated in FIG. 2.

The first conductive paste layer 31 includes a first portion 31a that configures the above-mentioned first facing portion 11a. The second conductive paste layer 32 includes a second portion 32a that configures the above-mentioned second facing portion 12a.

In view of reducing manufacturing variations of the capacitance of the laminated feedthrough ceramic capacitor 1, it is preferable that, out of the first portion 31a that configures the first facing portion 11a and the second portion 32a that configures the second facing portion 12a, the width of one portion be smaller than that of the other portion. This is because, even when the position of one portion with respect to the other portion is displaced in the width direction, the area of portions that face each other remains unchanged, and hence the capacitance hardly changes.

In contrast, in the present preferred embodiment, in the above-mentioned application, the first and second conductive paste layers 31 and 32 are preferably formed such that the width of the first portion 31a and the width of the second portion 32a are substantially identical. Here, the expression "the width of the first portion 31a and the width of the second portion 32a are substantially identical" refers to the fact that the ratio of the width of the second portion 32a to the width of the first portion 31a ((the width of the second portion 32a)/(the width of the first portion 31a)) is about 0.9 to about 1.1, for example.

Figure 8:
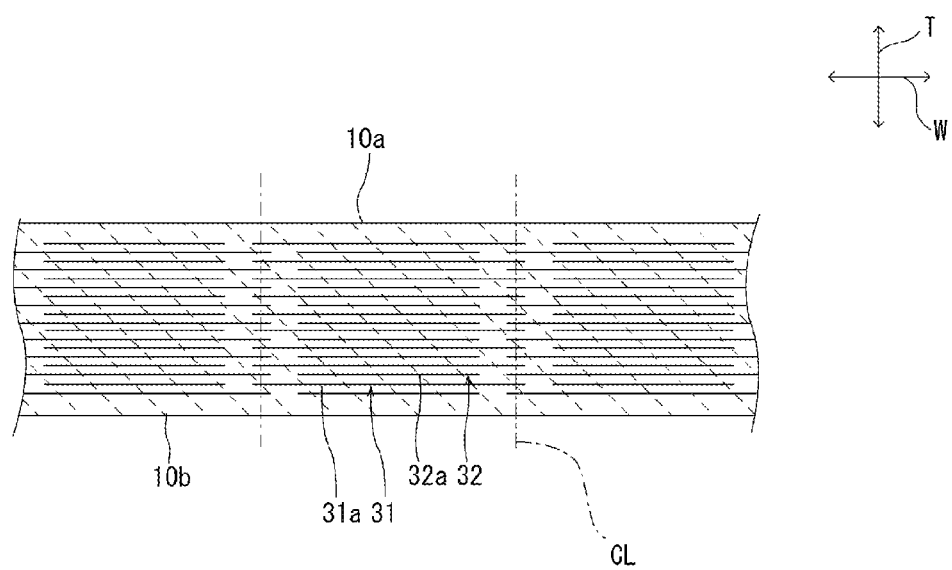
FIG. 8 is a schematic cross-sectional view taken along line VII-VII of FIG. 6.
Figure 9:
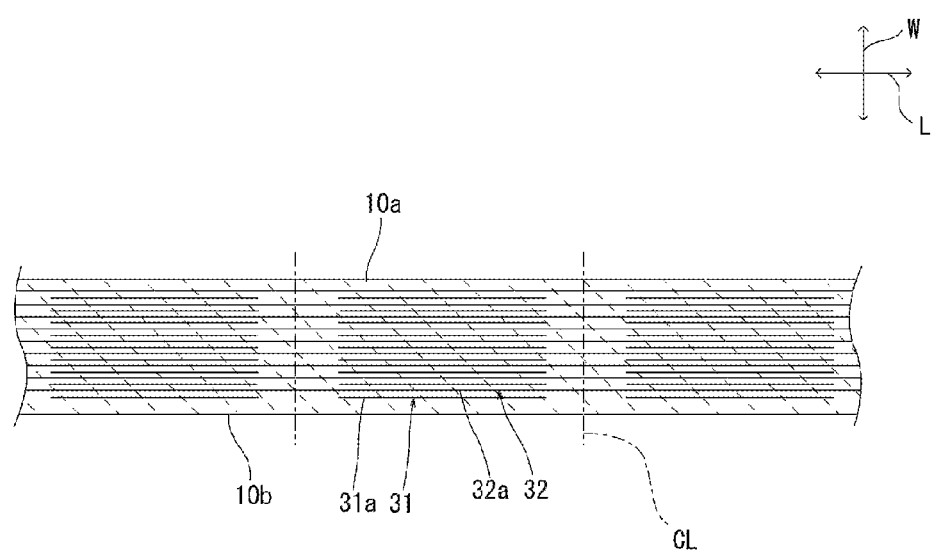
FIG. 9 is a schematic cross-sectional view taken along line VIII-VIII of FIG. 6.

Next, as illustrated in FIGS. 8 and 9, a plurality of ceramic green sheets on which no conductive paste layer is printed are laminated, and, on these laminated ceramic green sheets, ceramic green sheets on which the first conductive paste layer 31 is formed and ceramic green sheets on which the second conductive paste layer 32 is formed are alternately laminated. After that, a plurality of ceramic green sheets on which no conductive paste layer is printed are further laminated. Thereafter, the obtained laminate is pressed in the thickness direction T, thus producing a mother laminate.

In the above-described lamination step, a laminate is produced by laminating the green sheets such that the first conductive paste layer 31 printed on a first green sheet and the second conductive paste layer 32 printed on a second green sheet positioned on the first green sheet overlap each other. In lamination of the green sheets, the position of the second green sheet with respect to the first green sheet is determined such that the overall width of the first portion 31a printed on the first green sheet and the second portion 32a printed on the second green sheet becomes substantially equal to the width of the first portion 31a or the width of the second portion 32a.

Figure 10:
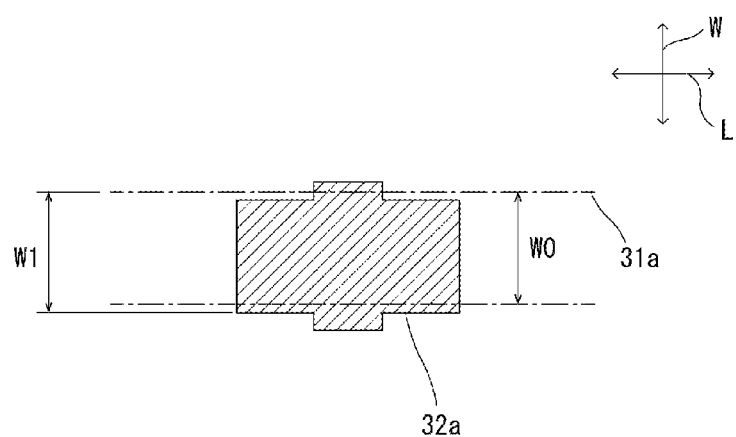
FIG. 10 is a diagram illustrating a state in which a first conductive paste layer and a second conductive paste layer are displaced from each other.
Figure 11:
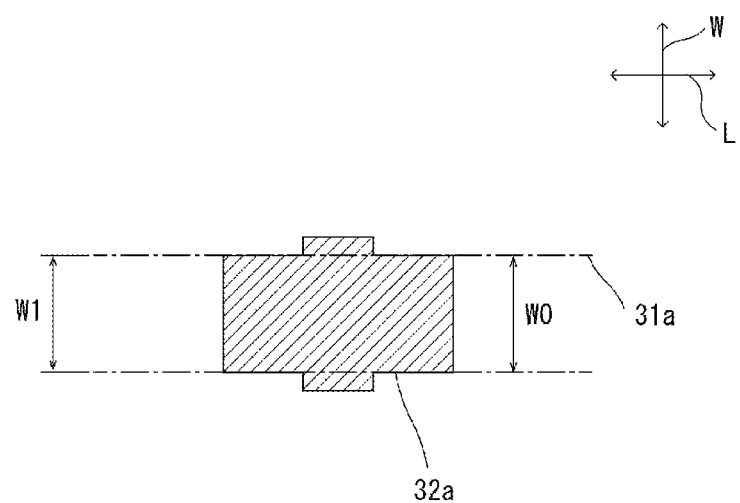
FIG. 11 is a diagram illustrating a state in which the first conductive paste layer and the second conductive paste layer are substantially aligned.

More specifically, the overall width of the first portion 31a and the second portion 32a is measured by irradiating the green sheets from one side and observing transmitted light from the other side. Here, it is assumed that the overall width of the first portion 31a and the second portion 32a is measured as W1. If W1 is substantially identical to the width W0 of the first portion 31a, for example, it can be determined that the laminated green sheets are preferably positioned. In contrast, if W1 is not substantially equal to W0, it can be determined that the laminated green sheets are not preferably positioned. Specifically, for example, as illustrated in FIG. 10, W1 becomes greater than W0 when the position of the first portion 31a is displaced from the position of the second portion 32a. In contrast, as illustrated in FIG. 11, W1 becomes substantially identical to W0 when the position of the first portion 31a is not displaced from the position of the second portion 32a.

In the case where W1 is not substantially identical to W0, the positions of green sheets to be laminated are adjusted again, and then W1 is measured again. This operation is repeated until W1 and W0 become substantially equal.

Note that the expression "W1 and W0 are substantially identical" refers to the fact that the ratio of W1 to W0 (W1/W0) is about 0.9 to about 1.1, for example.

Next, as illustrated in FIGS. 6, 8, and 9, the mother laminate is cut along virtual cut lines CL, thus producing a plurality of raw ceramic laminates from the mother laminate. Note that the mother laminate can be cut by dicing, or by pressing and cutting. Note that, as illustrated in FIG. 6, in cutting of the mother laminate, it is preferable to set the position of each of the cut lines CL between the tip in the width direction W of the second conductive paste layer 32 and the second portion 32a. That is, in a process of producing the laminated feedthrough ceramic capacitor 1, it is preferable to produce the laminated feedthrough ceramic capacitor 1 by partitioning the mother laminate along the cut lines CL each of which crosses a protruding portion. In doing so, the above-mentioned tip portion in the width direction W of the second conductive paste layer 32 can be used as a dummy electrode.

After the raw ceramic laminates are formed, chamfering or round-chamfering of the ridges of the raw ceramic laminates and polishing of the surface may be performed by barreling or the like.

Next, the raw ceramic laminates are baked. The baking temperature can be arbitrarily set depending on the type of a ceramic material and a conductive paste to be used.

Next, a conductive paste including a glass powder and a conductive material is applied onto each of the ceramic laminates, thus forming conductive paste layers that configure the third and fourth electrode layers 23 and 24 of the first and second signal terminal electrodes 15 and 16, and forming conductive paste layers that configure the first and second electrode layers 21 and 22 of the first and second ground terminal electrodes 17 and 18.

Next, the above-mentioned conductive paste layers are fired. Thereafter, a Ni-plated layer and a Sn-plated layer are formed in this order on the second electrode layer 22, and a Ni-plated layer and a Sn-plated layer are formed in this order on the fourth electrode layer 24. Accordingly, the first and second signal terminal electrodes 15 and 16 and the first and second ground terminal electrodes 17 and 18 preferably are produced.

With the above process, the laminated feedthrough ceramic capacitor 1 preferably is completed.

Positioning of the green sheets is generally performed by, for example, printing alignment marks on the green sheets along with the conductive paste layers, and positioning the green sheets by using the alignment marks.

The inventors have discovered that the above-described positioning method using the alignment marks has difficulty in manufacturing a laminated electronic component in which inner electrodes are provided with high positional precision. This is because the green sheets before being fired expand or shrink due to dryness, a temperature change, or the like, though this is not for sure. For example, in one conceivable case, although the overall dimensions of the green sheets remain unchanged, one portion of the green sheets locally shrinks, while another portion of the green sheets locally expands. Therefore, for example, even when the positions of alignment marks provided at four corners of the green sheets match, the positions of laminated conductive paste layers may not match. It is considered that this is one reason that causes the positional precision of inner electrodes to be low.

In the present preferred embodiment, as described above, the position of the second green sheet with respect to the first green sheet is determined such that the overall width of the first portion 31a printed on the first green sheet and the second portion 32a printed on the second green sheet becomes substantially equal to the width of the first portion 31a or the width of the second portion 32a. In this manner, the positions of portions that configure the inner electrodes 11 and 12 are directly detected, and the green sheets are positioned. Therefore, even if the green sheets expand or shrink, the laminated feedthrough ceramic capacitor 1 in which the inner electrodes 11 and 12 are provided with high positional precision can be manufactured.

In addition, since a capacitor according to the present preferred embodiment preferably is a laminated feedthrough capacitor, the first conductive paste layer 31 is formed in a strip shape in the length direction L. In doing so, displacement in the length direction L is able to be tolerated.

Note that, in the present preferred embodiment, the four-terminal laminated feedthrough ceramic capacitor 1 in which the first inner electrode 11 is extended to the first and second side surfaces 10c and 10d, and the second inner electrode 12 is extended to the third and fourth side surfaces 10e and 10f has been described by way of example. However, the preferred embodiments are not limited to this configuration. For example, the first inner electrode 11 may be extended only to the first side surface 10c, and the second inner electrode 12 may be extended only to the second side surface 10d. Only the first and second signal terminal electrodes 15 and 16 may be provided as external electrodes, and the first and second ground terminal electrodes 17 and 18 may not be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a laminated electronic component including an electronic component main body, a plurality of terminal electrodes disposed on external surfaces of the component main body, and first and second inner electrodes laminated in one direction in the electronic component main body, the first inner electrode including a first facing portion that faces in the one direction the second inner electrode, and the second inner electrode including a second facing portion that faces in the one direction the first facing portion, the method comprising:

preparing a plurality of green sheets on which both a first conductive film that configures the first inner electrode and a second conductive film that configures the second inner electrode are printed;

obtaining a laminate by laminating the plurality of green sheets such that the first conductive film formed on a first green sheet among the plurality of green sheets and the second conductive film formed on a second green sheet positioned on the first green sheet overlap each other; and producing the laminated electronic component from the laminate; wherein the step of preparing the plurality of green sheets includes forming the first and second conductive films on the green sheets such that, out of the first conductive film, a width of a first portion that configures the first facing portion, and, out of the second conductive film, a width of a second portion that configures the second facing portion become substantially identical;

the first and second conductive films are connected to the plurality of terminal electrodes such that a shape of the first conductive film is different from a shape of the second conductive film; and the step of obtaining the laminate includes determining a position of the second green sheet with respect to the first green sheet such that an overall width of the first portion formed on the first green sheet and the second portion formed on the second green sheet becomes substantially equal to the width of the first portion or the width of the second portion.

2. The method according to claim 1, wherein the first conductive film includes a plurality of first conductive films, and the plurality of first conductive films are formed in one direction on the green sheets; and the second conductive film includes a plurality of second conductive films, and the plurality of second conductive films are formed in the one direction on the green sheets.

3. The method according to claim 2, wherein the plurality of first conductive films are formed in the one direction while being connected with each other, and the first and second conductive films are alternately formed in another direction that is perpendicular or substantially perpendicular to the one direction.

4. The method according to claim 1, wherein
the second conductive film is formed to include, in addition to the second portion, a protruding portion that protrudes from the second portion toward outside in a width direction; and
the step of producing the laminated electronic component includes producing the laminated electronic component by partitioning the laminate along a cut line that crosses the protruding portion.

5. The method according to claim 1, wherein
the external surfaces of the electronic component main body includes first and second main surfaces, first and second side surfaces that face each other, and third and fourth side surfaces that face each other;
the first inner electrode is extended to the first and second side surfaces; and
the second inner electrode is extended to the third and fourth side surfaces.

6. The method according to claim 1, wherein the first and second conductive films are printed along an edge in a width direction of the first and second conductive films.

7. The method according to claim 1, wherein the first and second conductive films are formed by gravure printing.

8. The method according to claim 1, wherein
the step of preparing the plurality of green sheets includes obtaining the plurality of green sheets on which the first and second conductive films are printed by printing the first and second conductive films to obtain a mother laminate that configures the plurality of green sheets in one direction, and then cutting the mother laminate; and
the step of obtaining the laminate includes obtaining the laminate by laminating the second green sheet positioned on the first green sheet while displacing the second green sheet from the first green sheet in a direction perpendicular or substantially perpendicular to the one direction such that the first conductive film and the second conductive film overlap each other.

9. The method according to claim 1, wherein the laminated electronic component is a laminated feedthrough capacitor.

10. The method according to claim 1, wherein the external surfaces of the electronic component main body includes first and second main surfaces and the one direction is one of a length direction and a width direction of the first and second main surfaces.

11. The method according to claim 1, wherein a ratio of the width of the second portion to the width of the first portion is about 0.9 to about 1.1.

12. The method according to claim 1, further comprising the step of measuring whether an overall width of the first portion formed on the first green sheet and the second portion formed on the second green sheet becomes substantially equal to the width of the first portion or the width of the second portion, and if the overall width of the first portion formed on the first green sheet and the second portion formed on the second green sheet becomes substantially equal to the width of the first portion or the width of the second portion, adjusting positions of the green sheets to be laminated until the overall width of the first portion formed on the first green sheet and the second portion formed on the second green sheet becomes substantially equal to the width of the first portion or the width of the second portion.

13. The method according to claim 1, further comprising step of determining a position of the second green sheet with respect to the first green sheet that is performed by printing alignment marks on the green sheets and positioning the green sheets using the alignment marks.

14. The method according to claim 1, wherein the laminated electrode component is a four-terminal laminated feedthrough capacitor and the external surfaces of the electronic component main body includes first and second main surfaces, first and second side surfaces that face each other, and third and fourth side surfaces that face each other.

15. The method according to claim 14, wherein the first inner electrode extends to the first and second side surfaces, and the second inner electrode extends to the third and fourth side surfaces.

16. The method according to claim 14, wherein the first inner electrode extends only to the first side surface, and the second inner electrode extends only to the second side surface.

* * * * *